United States Patent
Bu et al.

(10) Patent No.: US 7,779,143 B2
(45) Date of Patent: Aug. 17, 2010

(54) SCALABLE METHODS FOR DETECTING SIGNIFICANT TRAFFIC PATTERNS IN A DATA NETWORK

(75) Inventors: Tian Bu, Middlesex, NJ (US); Jin Cao, Middlesex, NJ (US); Aiyou Chen, Union, NJ (US); Pak-Ching Lee, New York, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 447 days.

(21) Appl. No.: 11/770,430

(22) Filed: Jun. 28, 2007

(65) Prior Publication Data

US 2009/0006607 A1  Jan. 1, 2009

(51) Int. Cl.
*G06F 15/16* (2006.01)
(52) U.S. Cl. ...................................................... 709/232
(58) Field of Classification Search ........................ None
See application file for complete search history.

(56) References Cited

U.S. PATENT DOCUMENTS

| | | | | |
|---|---|---|---|---|
| 5,359,593 | A * | 10/1994 | Derby et al. ................. | 370/234 |
| 6,658,565 | B1 * | 12/2003 | Gupta et al. ................. | 713/153 |
| 2005/0039086 | A1 * | 2/2005 | Krishnamurthy et al. ...... | 714/57 |
| 2005/0131946 | A1 * | 6/2005 | Korn et al. ................ | 707/104.1 |
| 2007/0136285 | A1 * | 6/2007 | Cormode et al. ............... | 707/7 |
| 2007/0237410 | A1 * | 10/2007 | Cormode et al. ............ | 382/240 |
| 2008/0225740 | A1 * | 9/2008 | Martin et al. ............... | 370/252 |
| 2009/0073891 | A1 * | 3/2009 | Duffield et al. ............. | 370/252 |

OTHER PUBLICATIONS

Zhang et al. Improving Sketch Reconstruction Accuracy Using Linear Least Squares Method. [Retreived online in Sep. 17, 2009] Aug. 9, 2005 [Retreived from the Internet] <URL: http://www.usenix.org/event/imc05/tech/full_papers/lee/lee_html/paper.html>.*
Bruce Hansen. "Sample Splitting and Threshold Estimation." [Retreived online on Sep. 17, 2009] Apr. 1996. [Retreived from the Internet] <URL: http://fmwww.bc.edu/EC-P/WP319.pdf>.*
Schweller et al. "Reverse Hashing for Sketch-based Change Detection on High-speed Networks." [Retreived online on Sep. 17, 2009] 2004 [Retreived from the Internet] <URL: http://citeseerx.ist.psu.edu/viewdoc/download?doi=10.1.1.59.1954&rep=rep1&type=pdf>.*

(Continued)

*Primary Examiner*—Rupal D Dharia
*Assistant Examiner*—James Baron
(74) *Attorney, Agent, or Firm*—Duft, Bornsen & Fishman, LLP

(57) ABSTRACT

Methods and apparatuses are provided for detecting traffic patterns in a data network. A sequential hashing scheme can be utilized that has D hash arrays. Each hash array i, wherein $1 \leq i \leq D$, includes $M_i$ independent hash tables each having K buckets, with each of the buckets having an associated traffic total. Each of the keys corresponds with a single bucket of each of the $M_i$ independent hash tables of each hash array i. The keys of the data network are partitioned into D words. As traffic is received for a key, a traffic total of each bucket that corresponds with a key is updated. The hash arrays can then be utilized to identify high traffic buckets of the independent hash tables having a traffic total greater than a threshold value. The high traffic buckets can be used to detect significant traffic patterns of the data network.

20 Claims, 10 Drawing Sheets

OTHER PUBLICATIONS

Gaber et al. "Resource-aware Knowledge Discovery in Data Streams." [Retreived online on Sep. 17, 2009] 2004 [Retreived from the Internet] <URL: http://citeseerx.ist.psu.edu/icons/pdf.gif;jsessionid=3FA9D84147FB079B97A8D9DBDD41488F>.*

Bu et al. "A Fast and Compact Method for Unveiling Significant Patterns in High Speed Networks." Published by the IEEE in 2007. Retreived and downloaded from IEEE Xplore on Mar. 4, 2010.*

Abhishek Kumar, Jun Xu, Jia Wang, Oliver Spatschekand, and Li Li. Space-Code Bloom Filter for Efficient Per-Flow Traffic. Measurement. In Proc. of IEEE INFOCOM, Mar. 2004.Space-Code Bloom Filter for Efficient Per-Flow Traffic.

B. Bloom, Space/time trade-offs in hashing coding with allowable errors. Communications of the ACM, 13(7):422-426, 1970.

A. Broder and M. Mitzenmacher. Network applications of bloom filters: a survey. Internet Mathematics, 1(4):485:509, 2003.

G. Cormode, F. Korn, S. Muthukrishnan and D. Srivastava. Finding hierarchical heavy hitters in data streams. In VLDB, 2003.

C. Esten and G. Varghese New Directions in Traffic Measurement and Accounting: Focusing on the Elephants, Ignoring the Mice. ACM Trans. On Computer Systems, 21(3):270-313, Aug. 2003.

G. Cormode, and S. Muthukrishnan. What's New: Finding Significant Differences in Network Data Streams. In Proc. Of IEEE INFOCOM, Mar. 2004.

M. Kodialam, T. Lakshman and S. Mohanty. Runs bAsed Traffic Estimator (RATE): A Simple, Memory Efficient Scheme for Per-Flow Rate Estimation. In Proc. Of IEEE INFOCOM, Mar. 2004.

B. Krishnamurthy, S. En, Y. Zhang, andY. Chen. Sketch-based change detection: Methods, evaluation, and applications. In Internet Measurement Conference, 2003.

G. M. Lee, H. Liu, Y. Yoon, and Y. Zhang. Improving sketch reconstruction accuracy using linear least squares method. In Internet Measurement Conference, 2005.

G. Manku and R. Motwani. Approximate Frequency Counts over Data Streams. In Proc. VLDB, 2002.

R. Schweller, Z. Li, Y. Chen, Y. Gao, A. Gupta, Y. Zhang, P. Dinda, M. Kao, andG. Mermik. Reverse hashing for high-speed network monitoring: algorithms, evaluation, and applications. In IEEE INFOCOM, Barcelona, Spain, Apr. 2006.

* cited by examiner

FIG. 8
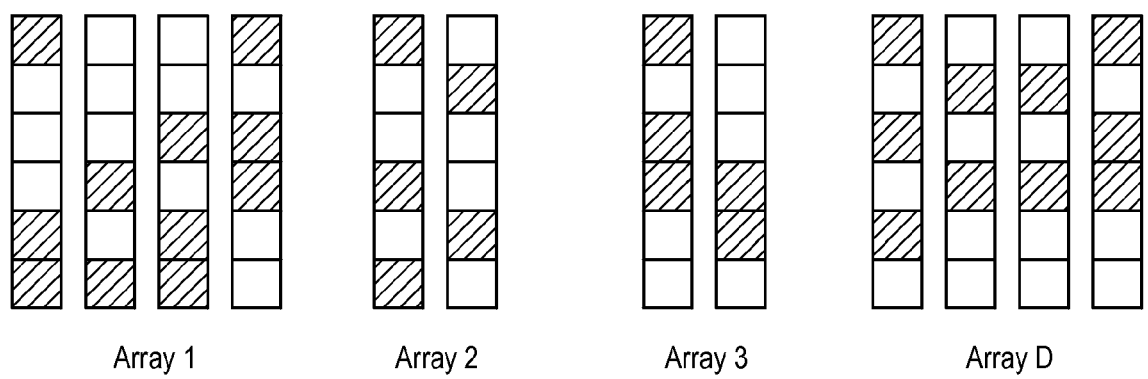
Array 1    Array 2    Array 3    Array D
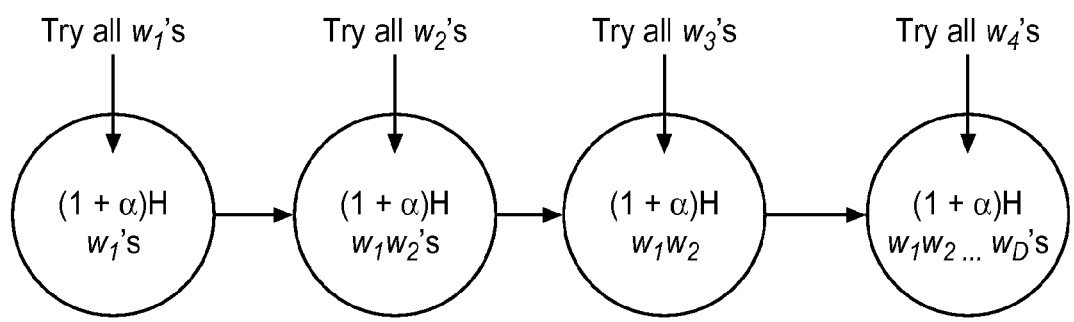

|  | Update step | | | Detection step | |
| --- | --- | --- | --- | --- | --- |
|  | memory | memory accesses | operations | memory | operations |
| Reversible Sketch | $\Theta\left(\frac{(\log N)^{\Theta(1)}}{\log \log N}\right)$ | $\Theta\left(\frac{(\log N)}{\log \log N}\right)$ | $\Theta(\log N)$ | $\Theta\left(N^{\frac{1}{\log \log N}} \cdot \log \log N\right)$ | $O\left(H N^{\frac{3}{\log \log N}} \cdot \log \log N\right)$ |
| Deltoids | $\Theta(H \log N)$ | $\Theta(\log N)$ | $\Theta(\log N)$ | $\Theta(H \log N)$ | $O(H \log N)$ |
| Sequential Hashing | $\Theta(H \log \frac{N}{\epsilon/l})$ | $\Theta(\log \frac{N}{\epsilon/l})$ | $\Theta(\log \frac{N}{\epsilon/l})$ | $\Theta(H \log \frac{N}{\epsilon/l} + \alpha H)$ | $\Theta(H \log \frac{N}{\epsilon/l} + (D-1)\alpha H 2^b)$ |

*FIG. 10*

SCALABLE METHODS FOR DETECTING SIGNIFICANT TRAFFIC PATTERNS IN A DATA NETWORK

BACKGROUND OF THE INVENTION

1. Field of the Invention

The invention is related to the field of communications, and in particular, to methods and apparatuses for detecting traffic patterns in a data network.

2. Statement of the Problem

Monitoring and detecting significant traffic patterns in a data network, such as the presence of persistent large flows or a sudden increase in network traffic due to the emergence of new flows, is important for network provisioning, management and security. Significant behaviors often imply events of interests on the data network, such as denial of service (DoS) attacks. Two significant behaviors detected on a network that are of interest to network operators are high traffic users (also known as heavy hitters) and significant traffic change users (also known as heavy changers). A high traffic user is a node whose traffic exceeds a predefined threshold. A significant traffic change user is a node whose change in traffic volume between two monitoring intervals exceeds a pre-defined threshold. A node may be herein referred to as a key, which is information which identifies a node or flow. A key may represent a source (internet protocol) IP address and/or port, a destination IP address and/or port, or combinations of source and destination IP addresses and/or ports, such as a five-tuple flow (source IP address, destination IP address, source port, destination port, and communication protocol).

For instance, a data flow that accounts for more than 10% of the total traffic of the data network, which is a high traffic user by data flow, may suggest a violation of a service agreement. On the other hand, a sudden increase of traffic volume flowing to a destination, which is a significant traffic change user by destination, may indicate either a hot spot, the beginning of a DoS attack, traffic rerouting due to link failures elsewhere, etc. The goal of significant key detection problems is to identify all significant keys (e.g., detecting keys which are high traffic users or significant traffic change users) and estimate their associated values with a low error rate while minimizing both memory usage and computational overhead.

As the internet and other data networks continue to grow in size and complexity, the increasing network bandwidth utilized poses challenges on monitoring significant keys in real time due to computational constraints and storage constraints. To identify any network flow that causes a significant amount of traffic or a significant traffic volume change, the system should scale up to at least $2^{104}$ keys$^2$ (i.e., the number of possible five-tuple flows: source IP address (32 bits), source port (16 bits), destination IP address (32 bits), destination port (16 bits) and communication protocol (8 bits)). Keeping track of per-key values is typically infeasible for large data networks due to processing and memory requirements imposed by the amount of keys and associated data tracked.

There are several important requirements for monitoring and detecting significant patterns in real time for high bandwidth links. The per-packet monitoring update speed should be able to catch up with the link bandwidth even in the worst case when all packets are of the smallest possible size. Otherwise, monitoring is not performed in real time. The detection delay of significant patterns should be short enough such that important events like network attacks and link failures can be responded to before any serious damage to the network occurs. Further, the false positive rate and the false negative rate should be minimized. A false negative may miss an important event and thus delay a necessary reaction. On the other hand, a false positive may trigger unnecessary responses that waste resources.

Data monitoring algorithms based on efficient data structures have been proposed for high traffic user detection and traffic-volume queries. These algorithms allow monitoring of data network traffic without tracking data individually for each separate key. One such data monitoring algorithm uses parallel hash tables to identify large flows using a memory that is only a small constant larger than the number of large flows. However, this technique only detects high traffic users, and does not detect users having significant changes in traffic. Other proposed techniques have been proposed that detect both high traffic users and users having significant changes in traffic. However, these algorithms are not memory-efficient and/or computationally efficient for use in high traffic networks.

SUMMARY OF THE SOLUTION

The invention solves the above problems and other problems by providing improved methods and apparatuses for detecting multiple types of traffic patterns in a data network (e.g., high traffic users and significant traffic change users) using less memory and computation time than previously utilized methods. A sequential hashing scheme can be utilized that uses O(H log N) memory overhead and computation overhead, which are close to being optimal values, where N is the number of all possible keys (e.g., flows, IP addresses) and H is the maximum number of significant keys of interest. This sequential hashing scheme makes it possible to trade off among memory, update costs, and detection costs in a large range that can be utilized by different computer architectures for optimizing the overall performance of the monitoring application or device.

An embodiment of the invention comprises a method for detecting traffic patterns in a data network. The method comprises partitioning keys of the data network into D words or sub-keys. Each key of the data network is partitioned into D words, each word $w_i$ having $b_i$ bits, wherein $1 \leq i \leq D$. The method further comprises constructing D hash arrays. Each hash array i, wherein $1 \leq i \leq D$, includes $M_i$ independent hash tables each having K buckets, and each of the buckets has an associated traffic total. Each of the keys corresponds with a single bucket of each of the $M_i$ independent hash tables. During a data collection process, the method comprises updating a traffic total of each bucket that corresponds with a key responsive to receiving traffic associated with the key. During an analysis process, the method comprises identifying high traffic buckets of the independent hash tables having a traffic total greater than a threshold value, and detecting traffic patterns of the data network based on the high traffic buckets.

Another embodiment of the invention comprises a method for detecting traffic patterns in a data network. The method comprises constructing a multi-level hashing structure with D hash arrays. Each hash array i, wherein $1 \leq i \leq D$, includes $M_i$ independent hash tables each having K buckets, and each of the K buckets has an associated traffic total. The method further comprises partitioning keys of the data network into D sub-keys. Each of the D sub-keys for the keys has a variable length of i between 1 to D, with the keys having a length of D. A value of i represents a number of sequential bits $b_i$ of the keys, with each of the D sub-keys corresponding with one of the D hash arrays. Further, each of the D sub-keys is associated with one bucket of each of the $M_i$ independent hash tables of a corresponding hash array i. The method further comprises receiving traffic for a key, identifying sub-keys of the key and updating a traffic total for buckets corresponding to the sub-keys of the key. The method further comprises identifying high traffic buckets of the $M_i$ independent hash tables of each hash array i, wherein $1 \leq i \leq D$, having a traffic total greater than a threshold value, identifying a first candidate set of possible high traffic users of the data network based on the high traffic buckets, and detecting high traffic users of the data network based on the first candidate set. The high traffic users are keys of the data network having a traffic total greater than or equal to a traffic total threshold. The method further comprises identifying a second candidate set of possible significant traffic change users of the data network based on the high traffic buckets, and detecting significant traffic change users of the data network based on the second candidate set. The significant traffic change users are keys of the data network having a change in traffic volume between two monitoring intervals which is greater than or equal to a traffic change threshold.

Identifying the first candidate set may comprise recursively performing from $|1 \leq i \leq D|$ for each of the D hash arrays the following steps: concatenating each sub-key x' of a set $C_{i-1}$ of high traffic sub-keys identified for a previously checked hash array i–1 with a set of possible bit values from 0 to $2^{b_i}-1$ to form a set of sub-keys x"; checking buckets of the $M_i$ independent hash tables of a presently checked hash array i corresponding to a hash of each of the sub-keys x" to determine whether traffic totals of any of the checked buckets are less than the threshold value; and adding one or more sub-keys x" of the set of sub-keys x" to a set $C_i$ of possible high traffic sub-keys responsive to determining that none of the checked buckets for the one or more sub-keys x" have traffic totals less than the threshold value. The first candidate set is based on a set $C_D$ of possible high traffic sub-keys.

Identifying the second candidate set comprises recursively performing from $|1 \leq i \leq D|$ for each of D hash arrays the following steps: concatenating each sub-key x' of a set $C_{i-1}$ of high traffic sub-keys identified for a previously checked hash array i–1 with a set of possible bit values from 0 to $2^{b_i}-1$ to form a set of sub-keys x"; checking buckets of each of the $M_i$ independent hash tables of a presently checked hash array i corresponding to a hash of each of the sub-keys x" to determine whether traffic totals of any of the checked buckets are less than the threshold value; determining a number of misses for each of the set of sub-keys x", wherein the number of misses for a sub-key x" is based on a number of checked buckets corresponding to the sub-key x" that have a traffic total less than the threshold value; adding one or more sub-keys x" of the set of sub-keys x" to a set $C_i$ of possible high traffic sub-keys responsive to determining that the number of misses for each of the one or more sub-keys x" is less than a predetermined number. The second candidate set is based on a set $C_D$ of possible high traffic sub-keys.

The invention may include other exemplary embodiments described below.

DESCRIPTION OF THE DRAWINGS

The same reference number represents the same element or same type of element on all drawings.

FIG. 8 illustrates a schematic illustration of the detection step in an exemplary embodiment of the invention.

FIG. 10 illustrates the update memory and recovery costs in an exemplary embodiment of the invention.

DETAILED DESCRIPTION OF THE INVENTION

FIGS. 1-12 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below may be combined in various ways to form multiple variations of the invention. As a result, the invention is not limited to the specific embodiments described below, but only by the claims and their equivalents.

Figure 1:
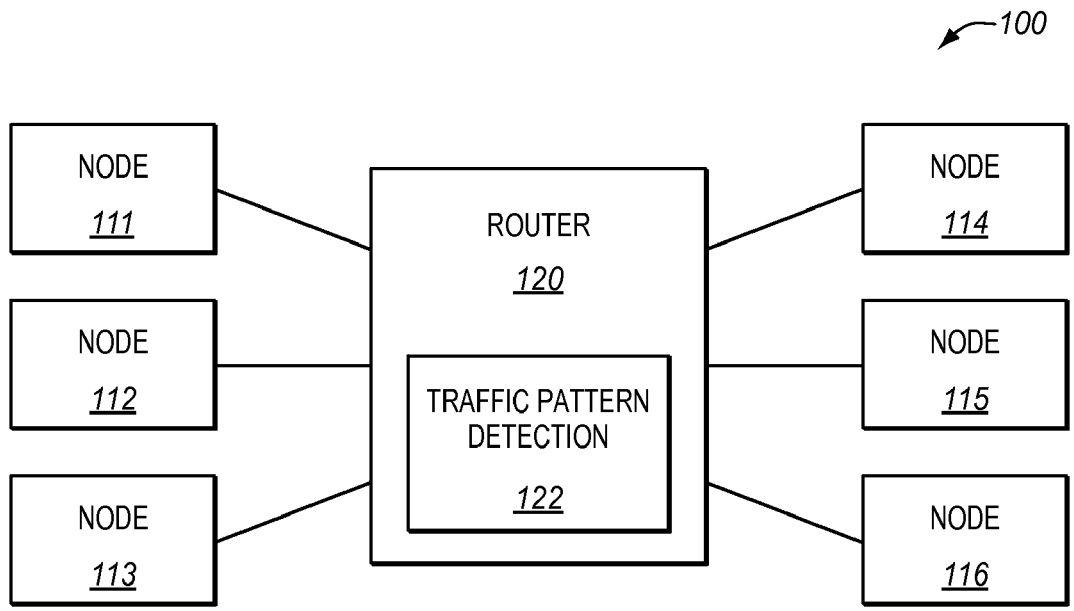
FIG. 1 illustrates a data network in an exemplary embodiment of the invention.

FIG. 1 illustrates a data network 100 in an exemplary embodiment of the invention. Data network 100 may be any type of data network, such as a high speed IP network. Data network 100 includes a router 120 connected to a plurality of nodes 111-116 (such as sources and destinations). Information identifying nodes 111-116 (such as IP addresses and/or ports) may be referred to as keys. As used herein, a key represents a source IP address and/or port, a destination IP address and/or port, or combinations of source and destination IP addresses and/or ports, such as a five-tuple flow (source IP address, destination IP address, source port, destination port, and protocol). Each node 111-116 is connected to router 120 through standard networking links.

Router 120 includes a traffic pattern detection module 122. Traffic pattern detection module 122 is adapted to monitor traffic through data network 100, and detect traffic patterns within data network 100. Traffic pattern detection module 122 parses data packets, and identifies information relating to the packets (e.g., size of a data transfer, source or destination, etc.) and utilizes the identified information for monitoring of data network 100. In an alternative embodiment, traffic pattern detection module 122 may be a device external to router 120 and coupled to router 120 and/or nodes 111-116 such that traffic flows through traffic pattern detection module 122 for monitoring purposes. Data network 100 may include additional elements, modules, devices, etc., not illustrated in FIG. 1 for the sake of brevity.

The following notation is used herein:

x refers to a key and $v_x$ refers to the traffic value associated with key x in the data stream;

N, $N_i$ refer to the size of a key set;

M, $M_i$ refer to the number of hash tables in one hash array;

U refers to the memory size utilized (e.g., the total number of buckets);

H refers to the true number of high traffic users/changes;

K refers to the size of a hash table;

$\gamma$ is H/K;

$\epsilon$, $\alpha$ refer to the expected number of false positives divided by H;

D refers to the number of hash arrays (also the number of words in a key);

C, $C_i$ refer to the size of the candidate set of high traffic users;

$y_{m,j}$, $y_{i,m,j}$ refer to the sum of $v_x$ for all values of x mapped to bucket j of table m;

(Notation with a subscript i denotes the corresponding quantities for the ith hash array in the sequential hashing scheme presented below).

A set of network traffic within a measurement interval may be modeled as a stream of data that arrives sequentially, where each item (x, $v_x$) consists of a key $x \in \{0, 1, \ldots, N-1\}$ and an associated traffic value $v_x$. The identification of significant keys (i.e., either high traffic users or significant traffic change users) may be determined if all values of $v_x$ are known. However, tracking the exact values of $v_x$ for all values of x may not be feasible for a large N (which is the size of the key set). To overcome this, a single hash array can be used to approximate the significant keys. The hash array consists of M hash tables each with K buckets. A bucket of a hash table is a notional receptacle, a set of which may be used to apportion data items for sorting or lookup purposes. The hash functions for each table are chosen independently from a class of 2-universal hash functions, so that the K buckets of each table form a random partition of N keys. Assume that $y_{m,j}$ is defined as the sum of $v_x$ for all values of x in the jth bucket in the mth hash table.

The lower bound of memory (in terms of the total number of buckets in a hash array) required for identifying the significant keys (e.g., the keys needing possible corrective measures) in network traffic using a single hash array is derived as follows for high traffic user detection (e.g., heavy hitters). Recall a high traffic user is a key x whose traffic value $v_x$ exceeds a pre-specified threshold t. Suppose there are H high traffic users. A high traffic bucket is considered significant (e.g., heavy) if its y value crosses the threshold t. For any high traffic user, a bucket that the hash of a key (or a sub-key) corresponds to in each of the M tables will be a significant bucket. Therefore, a superset of high traffic user keys, C can be formed by using the intersection of M subsets, each of which consists of keys in the significant buckets corresponding to one hash table.

In order to derive the lower bound of memory needed for monitoring, it is assumed that the traffic distribution is very skewed such that the sum of any set of non-high traffic user key values is less than the threshold, i.e., the contributions of non-high traffic users are negligible. For an expected size of the order H, assume that H<<N. Let Z be the number of high traffic users contained in an arbitrary bucket, and let $\gamma$=H/K, i.e., $K=\gamma^{-1}H$. The following two lemmas describe the distribution of Z and the expected size E|C| of set C in the lower bound case.

Lemma 1: $Z \approx$ Binomial(1/K, H). When H is large (say greater than 100), $Z \approx$ Poisson($\gamma$).

The proof is straightforward and is omitted for brevity. When $\gamma$=log 2 (see Theorem 1 below), Lemma 1 indicates that about 50% of the buckets do not contain any high traffic users and that among significant buckets, about 70% of them contain exactly one heavy hitter.

Lemma 2: $E|C| \approx H+(N-H)(1-1/K)^{HM}$. When H is large, then $E|C| \approx H+(N-H)(1-e^{-\gamma})^M$. (equation 1)

Proof: Let $p_e$ be the probability that a non-high traffic user falls into the set C. Notice the probability that a non-high traffic user falls into the significant buckets of the l-th table is $p_l \approx 1-(1-1/K)^H$, since each high traffic user can be treated independently as an approximation due to H<<N. The result follows readily from $$p_e = \prod_{l=1}^{M} p_l \text{ and } E|C| = H + (N-H)p_e.$$

For the set C, let $\epsilon$ be the expected normalized false positives defined as the expected number of false positives divided by H, (where the expected false positive error of the set C, defined by the number of false positives divided by the size of C, is $\epsilon/(1+\epsilon)$), i.e.

$$E|C|=H+\epsilon H. \quad \text{(equation 2)}$$

Then by equation 1, for a given value $\epsilon$ and a large H, the required number of tables of the hash array is $$M = -\frac{\log(N\varepsilon^{-1}H^{-1})}{\log(1-e^{-\gamma})}. \quad \text{(equation 3)}$$

Therefore, the required memory, say U≡M K, is logarithmic in N and linear in H. The following theorem states the minimal memory requirement for achieving a specified false positive error.

Theorem 1: Given an expected normalized false positives, $\epsilon$, the memory size U is minimized when K=H/log 2 and M=$\log_2$(N $\epsilon^{-1}H^{-1}$) for a large H (say larger than 100). The proof is based on minimizing the memory size directly, but the details are omitted for brevity.

Figure 2:
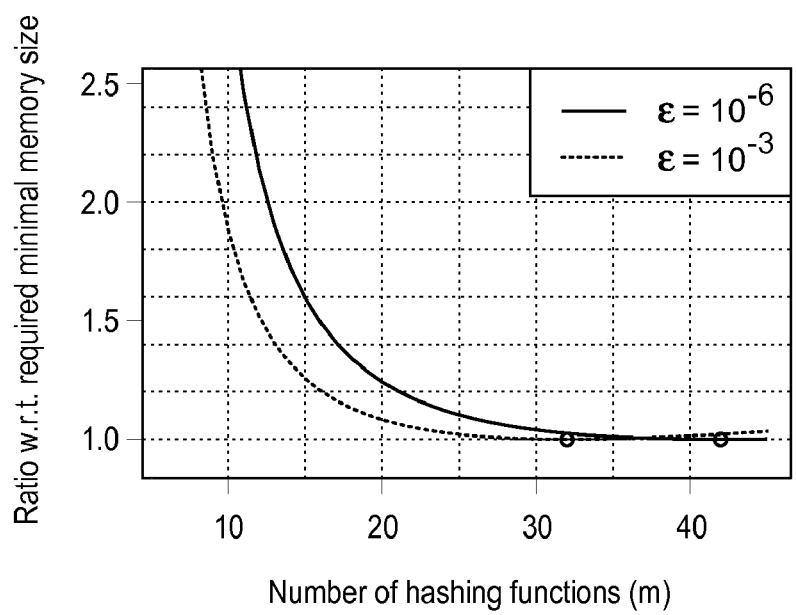
FIG. 2 shows the trade-off between M and U for the case where $N=2^{32}$, and H=1000 in the lower bound case in an exemplary embodiment of the invention.

There is a trade-off between the memory requirement and the hash computations for achieving a fixed false positive error. FIG. 2 shows the trade-off between M and U for the case where N=$2^{32}$, and H=1000 in the lower bound case in an exemplary embodiment of the invention. The circles represent the optimal pair of (M, U) such that U is minimized. To achieve the same expected normalized false positive error ($\epsilon$=$10^{-6}$ or $\epsilon$=$10^{-3}$), its possible to use just half of the optimal number of hashing tables with the price of increasing the memory size by about only 20%. This may be desirable when hash operations are considered expensive in terms of processing time.

The minimum memory needed for significant traffic change user detection can be computed as follows. For the (m,j)th bucket, let $y_{m,j}^{(1)}$, $y_{m,j}^{(2)}$ be the bucket values in monitoring intervals 1 and 2 respectively, and let $y_{m,j}=y_{m,j}^{(2)}-y_{m,j}^{(1)}$ be the change in the bucket value. For the case of significant traffic change users, a bucket is considered significant iff $|y_{m,j}|$ crosses a pre specified threshold t. When the values of non-significant traffic change users are negligible, unlike the high traffic user case presented above, it is now possible that some positive changers and negative changers collide in the same bucket such that the bucket is not considered significant (i.e., $|y_{m,j}|$ is less than t). Therefore, the outcome of the threshold test does not fully reflect the values of significant keys, and there will be a false negative error in addition to the false positive error when using the intersections of significant buckets to identify the significant traffic change users. To control the false negative error, misses are used, which refers to those non-significant buckets, so that a key is included in the candidate set if it falls into at least M−r significant buckets, where r is the number of allowed misses. Misses will be described in further detail below. This criterion may be modified using an additional constraint: for a miss (i.e., a non-significant bucket) to be considered legitimate, the bucket value in either $y_{m,j}^{(1)}$ or $y_{m,j}^{(2)}$ has to cross the threshold t. This refined criterion is useful in reducing the false positives. With the allowed r misses, the false positive rate will increase, and hence the memory requirement will increase. Also, when the values of non-high traffic users or changers become significant, both the false negative rate and the false positive rate will increase using the same hash array, and so does the memory requirement for a given false positive rate.

Multi-level Hashing

To identify the significant keys (i.e., keys with large traffic flows or high changes in traffic flows) in a total of N keys using a single hash array, one has to enumerate the entire key space to see if each key falls into some significant bucket in each of the tables in the hash array. Such an approach, however, is computationally expensive or even infeasible if the key space is very large.

A general framework of using a multi-level hashing scheme for recovering H significant elements or keys in a set of N keys is proposed when enumerating the entire key space becomes computationally prohibitive. The multi-level hashing scheme divides the original problem into much smaller sub problems where an exhaustive search can be applied. A special version of the general multi-level hashing scheme called sequential hashing can be used, which has a few desirable properties.

To illustrate the general idea of multi-level hashing, for a key x with $n=\log_2 N$ bits, the first focus is on identifying a sub-key of x with b bits that belongs to a significant key. Assume that b is sufficiently small (say 4 or 8) such that enumeration of this sub-key space for the identification of the significant sub-keys is now trivial using a hash array as described above. Next, the significant sub-keys that have just been found are concatenated with some remaining bits (say 2 or 4 bits) of the key to form a larger sub-key with more bits, say b' bits. Enumeration of this larger sub-key space (with b' bits) is now significantly reduced because the smaller sub-keys (with b bits) for significant keys are already known. Therefore, a new hash array can be used to identify the larger sub-keys of the significant keys. Repeating the process, one can eventually discover the key values of the significant keys in the original key space.

Sequential Hashing Scheme

A sequential hashing scheme can be used for identifying significant keys which is a special version of the multi-level hashing scheme discussed above. The sequential hashing scheme consists of two major processes: (1) an update step, which includes the value of a key into the associated buckets of the hash arrays, and (2) a detection step, which determines the set of significant keys.

Figure 3:
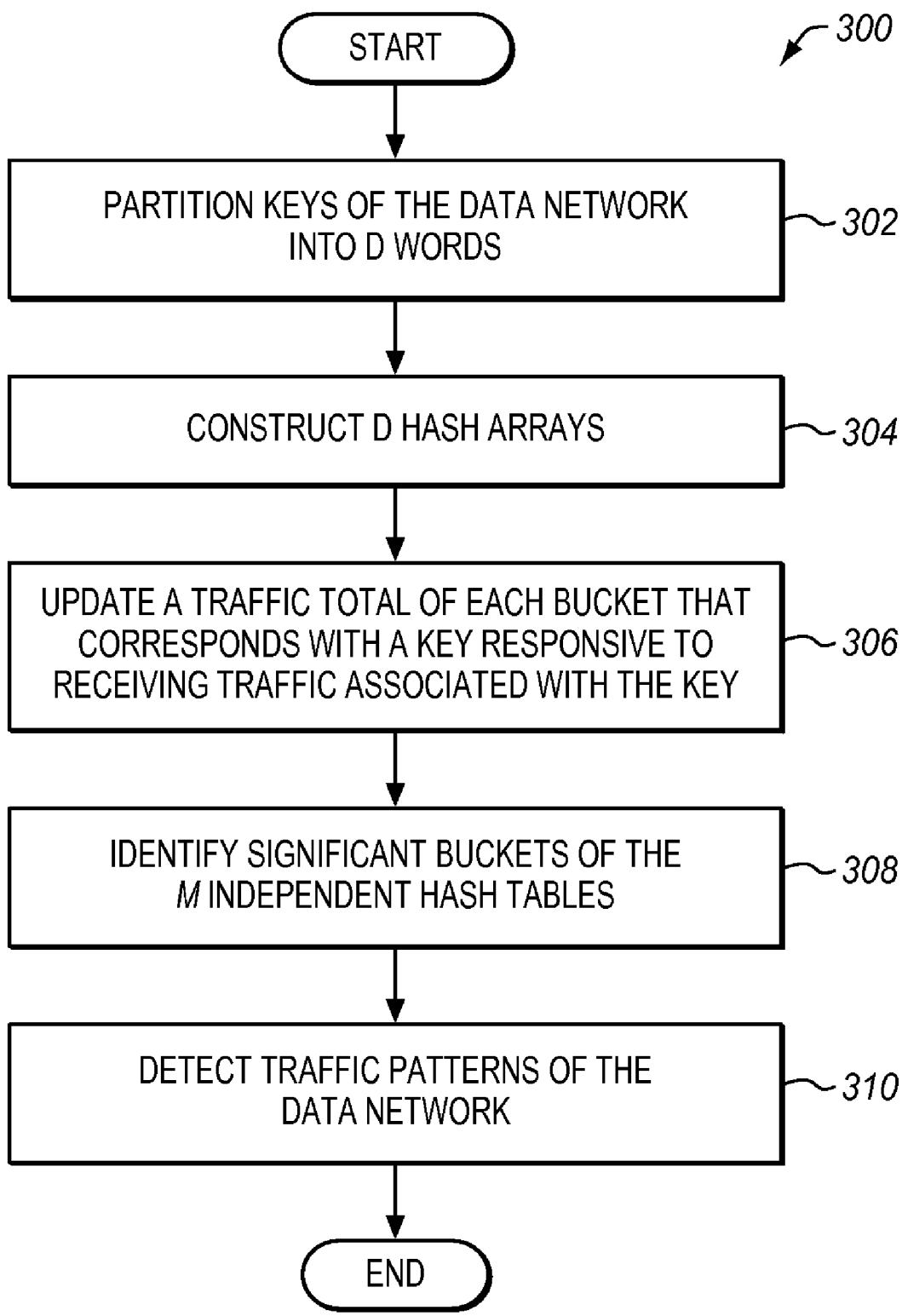
FIG. 3 illustrates a method for detecting traffic patterns in a data network in an exemplary embodiment of the invention.

FIG. 3 illustrates a method 300 for detecting traffic patterns in a data network in an exemplary embodiment of the invention. The steps of method 300 are described with reference to data network 100 illustrated in FIG. 1, and may be performed by traffic pattern detection module 122. The steps of method 300 are not all-inclusive, and may include other steps not shown for the sake of brevity.

Figure 4:
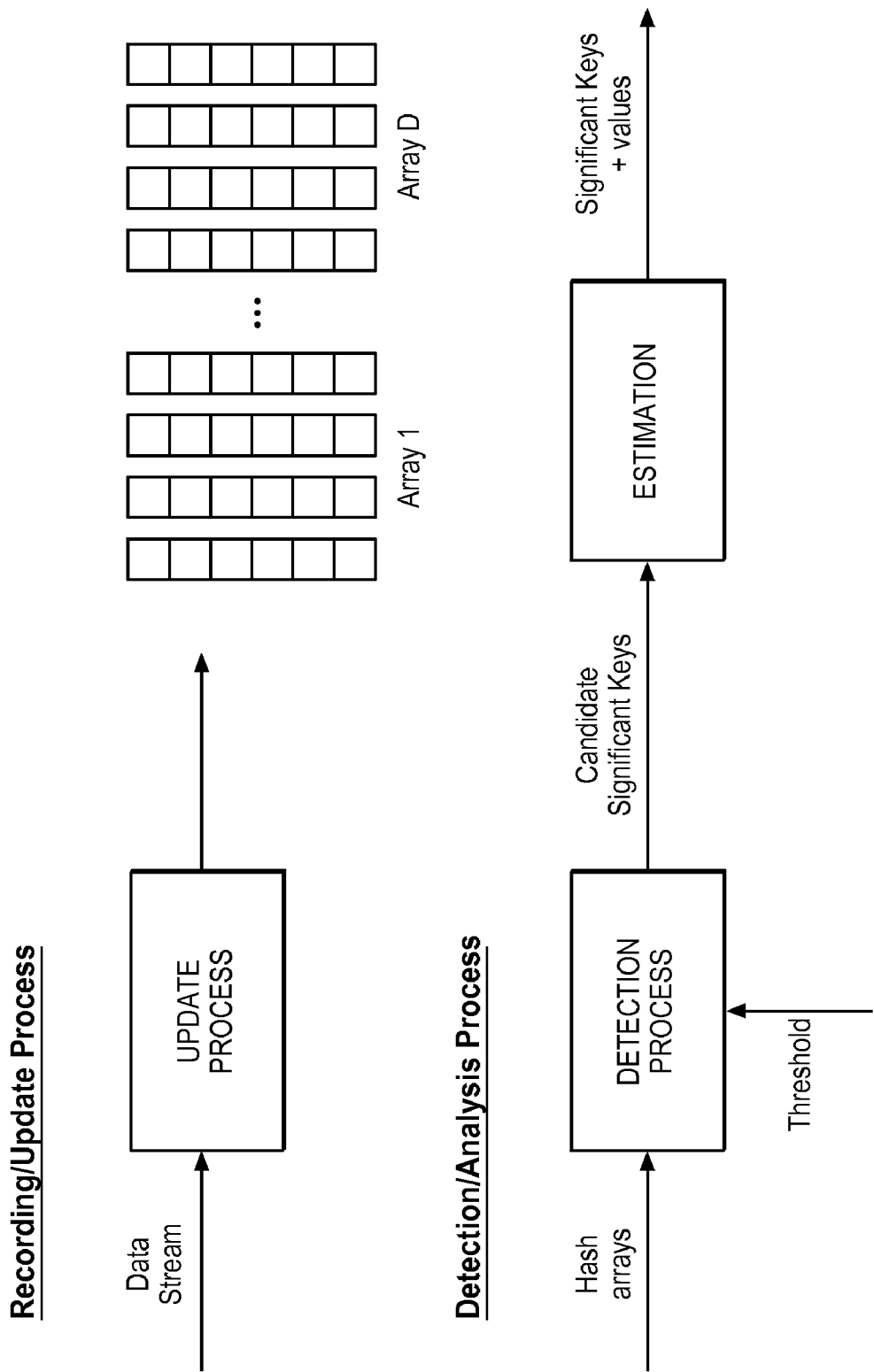
FIG. 4 illustrates a process flow diagram of the method of FIG. 3 in an exemplary embodiment of the invention.

FIG. 4 is a process flow diagram of method 300 of FIG. 3 in an exemplary embodiment of the invention. During the recording update/process, the data stream is received and information relating to traffic of the data stream is recorded onto the hash arrays. During the detection/analysis process, the hash arrays are used as input to determine which buckets of the hash arrays are considered significant (i.e., have a traffic total greater than or equal to a threshold value). These significant buckets are then used to estimate significant keys, and the values related to the significant keys are used to estimate and detect traffic patterns on the data network, such as high traffic users or significant traffic change users.

In step 302 of FIG. 3, traffic pattern detection module 122 partitions keys (e.g., addresses of nodes 111-116) of data network 100 into D words. Each key of data network 100 is partitioned into D words, each word $w_i$ having $b_i$ bits, wherein $1 \leq i \leq D$. Assume that each node 111-116 is tracked using a key corresponding to a source IP address, which is 32 bits in length. Thus, in one embodiment, the keys may be partitioned into 8 words, each having 4 bits. The first word may comprise the first 4 bits of the key, the second word may comprise the next 4 bits of the key, etc. The D words are used to construct D hash arrays. Those of ordinary skill in the art will recognize that the described partitioning scheme is just one embodiment for partitioning a key into D words. The partitioning scheme, such as the length of each word, will be dependent upon desired design criteria.

In step 304, traffic pattern detection module 122 constructs D hash arrays. Each hash array i, wherein $1 \leq i \leq D$, includes $M_i$ independent hash tables, each having K buckets. Each of the buckets has an associated traffic total. The traffic total is an aggregate of traffic values of keys associated with the bucket. Further, each of the keys corresponds with a single bucket of each of the independent hash tables of all hash arrays.

Figure 5:
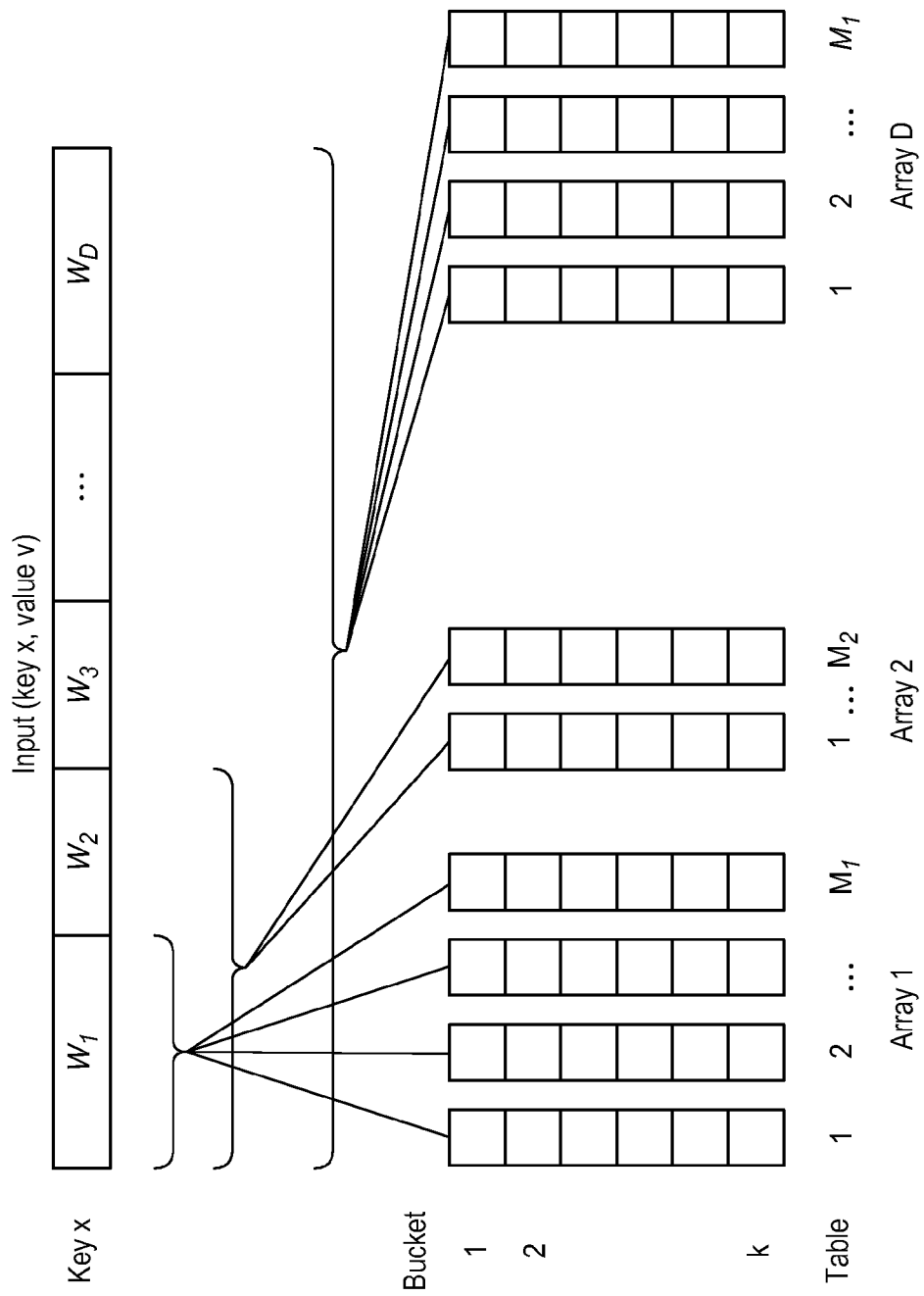
FIG. 5 illustrates the relationship between a key and hash arrays of the sequential hashing scheme in an exemplary embodiment of the invention.

FIG. 5 illustrates the relationship between a key and a hash array of the sequential hashing scheme in an exemplary embodiment of the invention. Key x is illustrated as having D words $w_1$ to $w_D$, each word $w_i$ having $b_i$ bits, wherein $1 \leq i \leq D$. Each word $w_i$ can be considered a sub-key of the original key x. Word $w_1$ corresponds to hash array 1, which has $M_1$ independent hash tables 1 to $M_1$. Words $w_1 w_2$ correspond to hash array 2, which has $M_2$ independent hash tables 1 to $M_2$. Word $w_1 w_2 \ldots w_D$ comprises the entire key x, and corresponds to hash array D, which has $M_D$ independent hash tables 1 to $M_D$. Each hash table has K buckets. An independent hash function is chosen for each hash table such that the K buckets of each hash table form a random partition of N keys (where N is the number of keys in the domain of keys being tracked).

Consider the sub-key $w_1 \ldots w_i$ formed by the first i words of key x. Let $$N_i = 2 \sum_{r=1}^{i} b_r,$$

and let $N_i$ be the corresponding sub-key space $\{0, 1, \ldots, N_i-1\}$, which contains all possible values of sub-key $w_1 \ldots w_i$. In each sub-key space $N_i$, let $H_i$ denote the set of sub-keys of those significant keys in the original key space. Note that $H_i$ is at most of size H. Thus, the ith hash array of the set of D hash arrays corresponds to a sub-key $w_1 \ldots w_i$ and contains $M_i$ hash tables $T_{i,1}, \ldots, T_{i,M_i}$.

Recordation/Update Process

Figure 6:
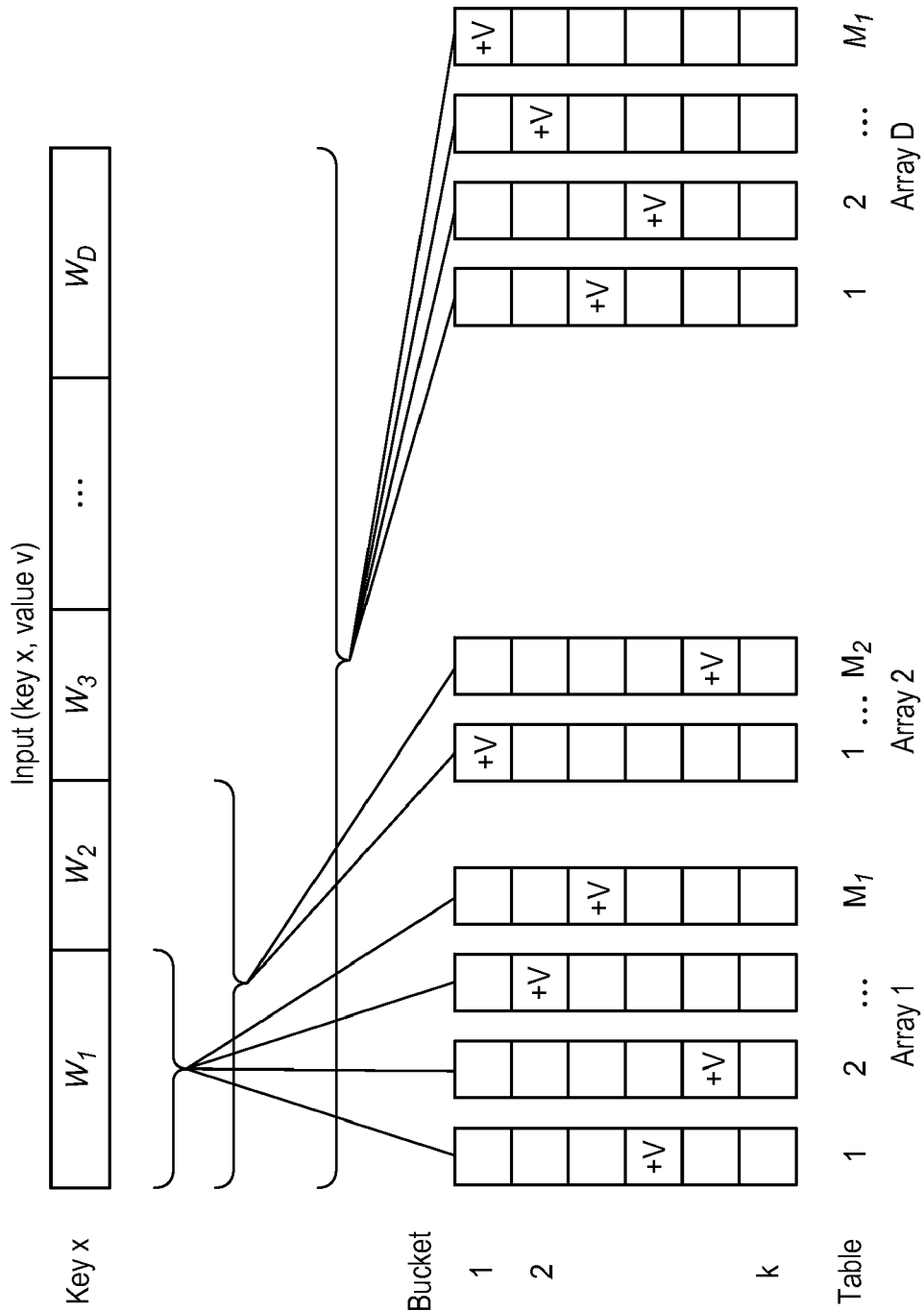
FIG. 6 illustrates a schematic illustration of buckets of the hash array of FIG. 6 which are updated responsive to receiving traffic associated with a key in an exemplary embodiment of the invention.

In step 306 of FIG. 3, traffic pattern detection module 122 updates a traffic total of each bucket that corresponds with a key responsive to receiving traffic associated with the key. Assume for example that traffic is received corresponding to key x (see FIG. 5). Key x has a corresponding traffic value v. Key x is partitioned into D words ($w_1$ to $w_D$), and one or more hash functions $f_{i,j}$ are applied to determine the buckets corresponding to key x. FIG. 6 illustrates a schematic illustration of buckets of the hash array 500 of FIG. 5 which are updated responsive to receiving traffic associated with key x in an exemplary embodiment of the invention. The updated buckets are illustrated as +v. Each updated bucket has its associated traffic total incremented by the value of +v. The aggregated traffic total for each bucket may comprise any metric related to traffic values and network performance, such as a total volume of traffic (e.g., total bytes), a total number of requests and/or responses, etc. An exemplary update algorithm is illustrated below.

---
Algorithm 1 - Update step

Input: a key x with a value v
1:  Partition key x into D words as $w_1 w_2 ... w_D$ where word $w_i$ has $b_i$ bits for $1 \leq i \leq D$.
2:  for i = 1 to D do
3:      for j = 1 to $M_i$ do
4:          Increment the counter of bucket $f_{i,j}(w_1...w_i)$ in hash table $T_{i,j}$ with value v.
---

Thus, for each incoming key $x = w_1 ... w_D$ with value v, the sub-key $w_1 ... w_i$ is associated with a hash function $f_{i,j}$ to a bucket $f_{i,j}(w_1 ... w_i) \in \{1, ..., K\}$ in hash table $T_{i,j}$, where $1 \leq i \leq D$, $1 \leq j \leq M_i$, and $1 \leq k \leq K$. The traffic total of the buckets are each incremented with value v.

Detection/Analysis Process

In step 308 of FIG. 3, traffic pattern detection module 122 identifies high traffic buckets of the independent hash tables having a traffic total greater than a threshold value. The process may be a recursive process, which is described in detail below. The high traffic buckets comprise candidate significant keys of interest. In step 310, traffic pattern detection module 122 detects traffic patterns of data network 100 based on the high traffic buckets. The detected traffic patterns may include high traffic users and significant traffic change users. The detection of each of these users is performed in a similar manner using different methods, and exemplary methods for detecting these users is described in detail below.

Figure 7:
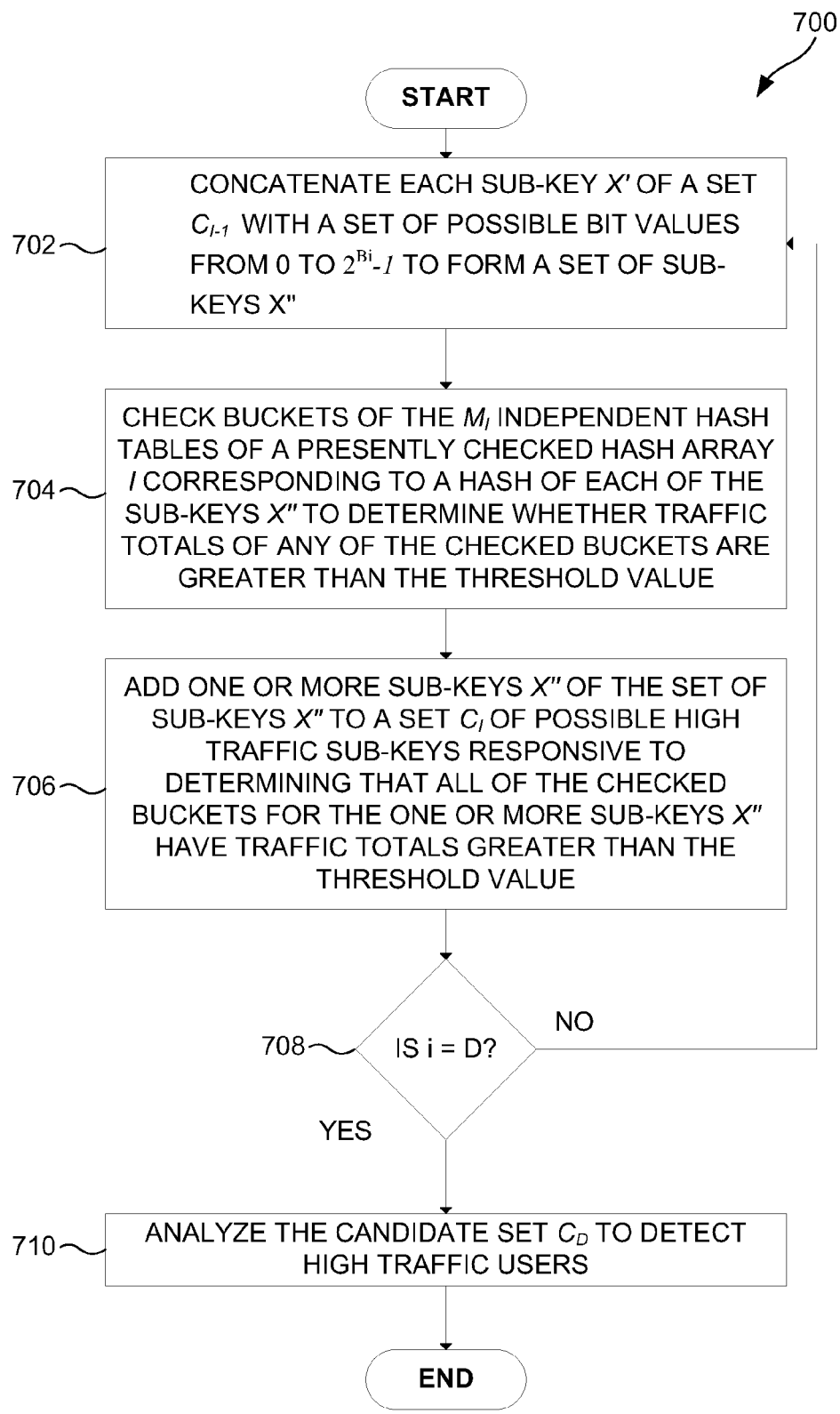
FIG. 7 illustrates a method for detecting high traffic users in a data network in an exemplary embodiment of the invention.

Detection of high traffic users may be performed using the significant buckets with the updated traffic totals identified in step 306 of FIG. 3. FIG. 7 illustrates a method 700 for detecting high traffic users in a data network in an exemplary embodiment of the invention. The steps of method 700 may be performed by traffic pattern detection module 122 (see FIG. 1). The steps of method 700 are not all-inclusive, and may include other steps not shown for the sake of brevity.

The method comprises identifying a candidate set of possible high traffic users based on high traffic buckets. Identifying the candidate set comprises recursively performing from $|1 \leq i \leq D|$ for each of the D hash arrays the following steps:

Step 702—Concatenating each sub-key x' of a set $C_i$−1 of high traffic sub-keys identified for a previously checked hash array i−1 with a set of possible bit values from 0 to $2^{b_i}$−1 to form a set of sub-keys x".

Step 704—Checking buckets of the $M_i$ independent hash tables of a presently checked hash array i corresponding to a hash of each of the sub-keys x" to determine whether traffic totals of any of the checked buckets are greater than the threshold value.

Step 706—Adding one or more sub-keys x" of the set of sub-keys x" to a set $C_i$ of possible high traffic sub-keys responsive to determining that all of the checked buckets for the one or more sub-keys x" have traffic totals greater than the threshold value.

Step 708—Determining whether i=D. If i=D, then the recursive loop ends, and the candidate set is based on a set $C_D$ of possible high traffic sub-keys. Processing then continues in step 710. Otherwise, if i is less than D, then i is incremented, and processing continues in step 702.

Algorithm 2 (illustrated below) summarizes the detection steps (steps 702-708) for the case of detecting a high traffic user. The main idea is to decompose the original problem of finding H significant keys into a sequence of D nested sub-problems, each of which determines a candidate set $C_i$ from subspace $N_i$ as an approximation of $H_i$. To begin, $C_i$ is identified by searching for all values in $N_1$ that have all their associated buckets in $T_{i,i}, ..., T_{i,M1}$ considered to be significant, i.e., the traffic total of a bucket exceeds a pre-specified threshold. To determine $C_i$, where $2 \leq i \leq D$, each sub-key $x' \in C_{i-1}$ is concatenated with an arbitrary word $w_i \in \{0, ..., 2^{b_i}-1\}$ to form sub-keys x". A sub-key x" is then included into $C_i$ if all its associated buckets in $T_{i,1} ... T_{i,Mi}$ are significant (i.e., the variable flag remains TRUE). Processing is then continued, and the output of the algorithm is the candidate set $C_D$. FIG. 8 illustrates a schematic illustration of the detection step in an exemplary embodiment of the invention.

---
Algorithm 2 - Detection step

Inputs: hash tables $\{T_{i,j}\}$ $1 \leq i \leq D$, $1 \leq j \leq M_i$ with significant buckets
Output: a set of significant keys
1:  Set $C_0 = \{0\}$ and $C_i = \phi$ for $1 \leq i \leq D$
2:  for i = 1 to D do
3:      for all $x' \in C_{i-1}$ do
4:          for $w_i = 0$ to $2^{b_i} - 1$ do
5:              $x" = x' \times 2^{b_i} + w_i$
6:              Set flag = TRUE
7:              for j = 1 to $M_i$ do
8:                  if bucket $f_{i,j}(x")$ in $T_{i,j}$ NOT heavy then
9:                      Set flag = FALSE
10:                     Exit the for-loop of lines 7-10
11:             if flag == TRUE then
12:                 Add x" to $C_i$
13: return $C_D$
---

The method of FIG. 7 further comprises analyzing the candidate set to detect the high traffic users in step 710. One exemplary technique for analyzing the candidate set is performing linear regression on the candidate set $C_D$, which is described in detail below.

Figure 9:
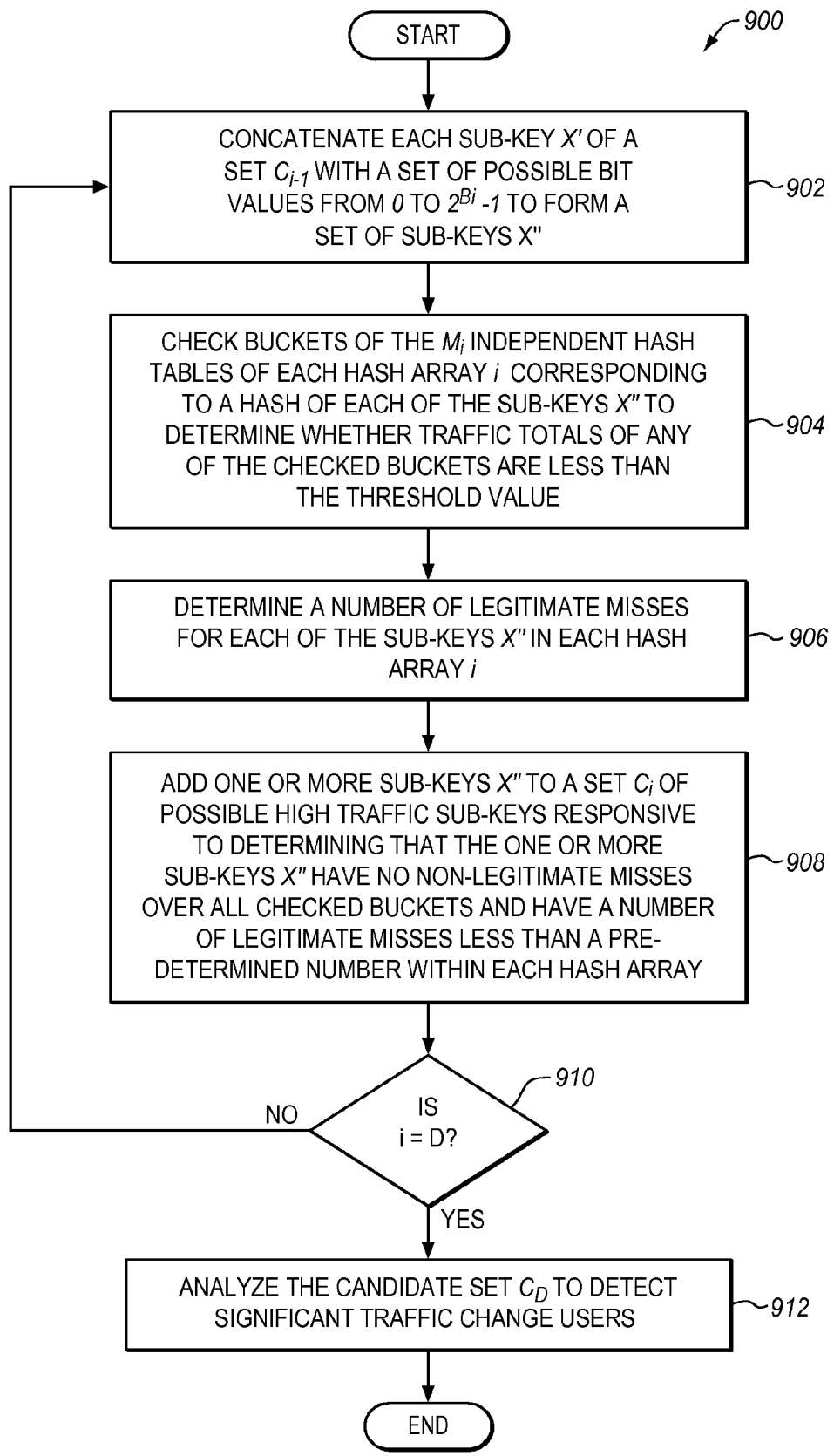
FIG. 9 illustrates a method for detecting significant traffic change users in a data network in an exemplary embodiment of the invention.

Detection of significant traffic change users may be performed using the significant buckets with the updated traffic totals identified in step 306 of FIG. 3. FIG. 9 illustrates a method 900 for detecting significant traffic change users in a data network in an exemplary embodiment of the invention. The steps of method 900 may be performed by traffic pattern detection module 122 (see FIG. 1). The steps of method 900 are not all-inclusive, and may include other steps not shown for the sake of brevity.

The method comprises identifying a candidate set of possible significant traffic change users based on the high traffic buckets, wherein identifying the candidate set comprises recursively performing from $1 \leq i \leq D$ for each of the D hash arrays the following steps:

Step 902—Concatenating each sub-key x' of a set $C_{i-1}$ of high traffic sub-keys identified for a previously checked hash array i−1 with a set of possible bit values from 0 to $2^{b_i}-1$ to form a set of sub-keys x".

Step 904—Checking buckets of each of the $M_i$ independent hash tables of a presently checked hash array i corresponding to a hash of each of the sub-keys x to determine whether traffic totals of any of the checked buckets are less than the threshold value.

Step 906—Determining a number of misses for each of the set of sub-keys x", wherein the number of misses for a sub-key x" is based on a number of checked buckets corresponding to the sub-key x" that have a traffic total less than the threshold value.

Step 908—Adding one or more sub-keys x" of the set of sub-keys x" to a set $C_i$ of possible high traffic sub-keys responsive to determining that the number of misses in each hash array i for each of the one or more sub-keys x" is less than a predetermined number.

Step 910—Determining whether i=D. If i=D, then the recursive loop ends, and the candidate set is based on a set $C_D$ of possible high traffic sub-keys. Processing then continues in step 912. Otherwise, if i is less than D, then i is incremented, and processing continues in step 902. The candidate set is based on a set $C_D$ of possible high traffic sub-keys.

Step 912 comprises analyzing the candidate set to detect the significant traffic change users. One exemplary technique for analyzing the candidate set is performing linear regression on the candidate set $C_D$, which is described in detail below.

Algorithm 2 illustrated is performed for high traffic user detection. For significant traffic change user detection, the algorithm may be modified to include $r_i$ allowed misses for the ith hash array. This is accomplished, by modifying line 8 as follows: set the flag to FALSE if bucket $f_{i,j}(x')$ is a non-legitimate miss, or the number of legitimate misses over the hash array i exceeds $r_i$. To be considered a legitimate miss, the bucket value in either $y_{m,j}^{(1)}$ or $y_{m,j}^{(2)}$ has to cross the threshold t. Thus, a non-legitimate miss does not cross the threshold t in one of the monitoring intervals.

Mathematical Complexity Analysis When Non-significant Keys are Negligible

A mathematical complexity analysis of the sequential hashing scheme in terms of memory and computation, and discussion of the design choices to achieve the most savings in both memory and computation for a targeted false positive rate are presented. The situation analyzed is the case when the non-significant keys have negligible contribution to the traffic total values of the buckets. This result can be extended to the situation of where non-significant keys have large enough values to influence the overall totals of the buckets. With the right design choice, this scheme can reduce the computation in the detection step from $\emptyset(N)$ (by enumerating all N keys) to $O(H \log_2 N)$ with very little increase in the total memory.

Assume the significant keys are distributed randomly in the key space, then it can be shown that the expected size of $H_i$ (i.e., the distinct first i words of H significant keys) is $E|H_i| \approx N[1-(1-1/N_i)^H] \approx H$, (equation 4), where the approximation holds when $Ni \gg H$ (this is satisfied when $N_i > 64H$. When the non-significant keys have negligible contribution to the traffic total values of the buckets, the optimal value of K which minimizes the memory requirement is $K=\gamma^{-1}H$ with $\gamma=\log 2$, which is independent of the size of the key space. Therefore, it is possible to choose the same number of buckets K for the hash tables in each hash array.

For the ith sub-problem, where $1 \leq i \leq D$, suppose that the expected number of false positives normalized by H is $\alpha i$ for $1 \leq i \leq D-1$ and $\epsilon$ for i=D, i.e., $E|C_i|=H+\alpha iH$, $E|C|=E|C_D|=H+\epsilon H$, $1 \leq i \leq D$. Therefore the expected number of keys to be enumerated for each sub-problem is $2^{b_i}$ for i=1, and $(1+\alpha i-1)H2^{b_i}$ for $2 \leq i \leq D$. Since the complexity of each sub-problem is determined by the size of keys to be enumerated, it is now natural to let all the sub-problems have the same expected number of keys to be enumerated. This can be achieved by letting $\alpha i=\alpha$, and dividing the whole key into D words such that $2^{b_i}=(1+\alpha)H2^b$, and $b_i=b$, $2 \leq i \leq D$. (equation 5)

Under this setting, two main quantities may be considered for the complexity study when the non-significant keys are negligible: the update memory and the recovery cost, which are listed in FIG. 10. How the complexity grows as a function of H and N then becomes of interest.

1) Update Memory: By applying (equation 3) to each sub-problem i (replacing N with $(1+\alpha)H$), $1 \leq i \leq D-1$, the required total number of hash tables with a size $K=\gamma^{-1}H$ is $$\overline{M} = \sum_{i=1}^{D-1} r\log_2((1+\alpha)H\alpha^{-1}H^{-1}) + r\log_2(N\varepsilon^{-1}H^{-1}) \quad \text{(equation 6)}$$
$$= r\log_2(N/(\varepsilon H)) + r(D-1)\log_2(1+\alpha-1),$$

where $r=-1/\log_2(1-e^{-\gamma})$. Notice that the first quantity in (equation 6) is the total number of tables required to recover the H significant keys using a single random hash array by enumerating all the keys in the original space, for the same normalized false positive number $\epsilon$. Therefore, the latter quantity in (equation 6) is the additional number of tables required for the sequential hashing scheme, which decreases when $\alpha$ increases.

2) Detection Cost: The detection cost is defined as the number of hash operations needed to recover all significant keys. Since the number of keys to be enumerated is $(1+\alpha)H2^b$ for each sub-problem under equation 5, and in the worst case, for each sub-key, it becomes necessary to check all $M_i$ tables to include or exclude it, the total hash computation required is Computation$\leq (1+\alpha)2^b H\overline{M}=\gamma^{-1}(1+\alpha)2^b \times$(Memory) (equation 7).

Design Choices When Non-significant Keys are Negligible

Given a normalized false positive number $\epsilon$, the sequential hashing scheme has two tuning parameters: $\alpha$, the intermediate normalized false positives, and b the number of bits of each word except the first one. Notice that by equation 5, the number of total words D is a function of $\alpha$, b since $\log_2(1+\alpha)+bD=\log_2(H^{-1}N)$ (equation 8). The design problem can be formulated as an optimization problem which tries to minimize both the memory increase and the computational cost, i.e., following (equation 3) and (equation 7), to minimize $(D-1) \log_2(1+\alpha^{-1})$ and $(1+\alpha)2^b$, given the constraint of equation 8 and $(1+\alpha)2^b > 64$ so that equation 4 will be satisfied. Notice that the computation is exponential in b, therefore b should be small. For a fixed small b, if $\alpha=O(\log_2 N)$, then the memory increase is bounded by a constant and the computation is $O((\log_2 N)^2)$. If a is of $O(1)$, then the memory increase is $O(\log N)$ and the computation is $O(\log N)$ as well. For practical values of $\log_2 N$ (say 32 bits), there is little difference in the memory increase when b is between 1 to 5 bits by setting $(1+\alpha)2^b > 64$ (the number of tables differs at most by 2).

Figure 11:
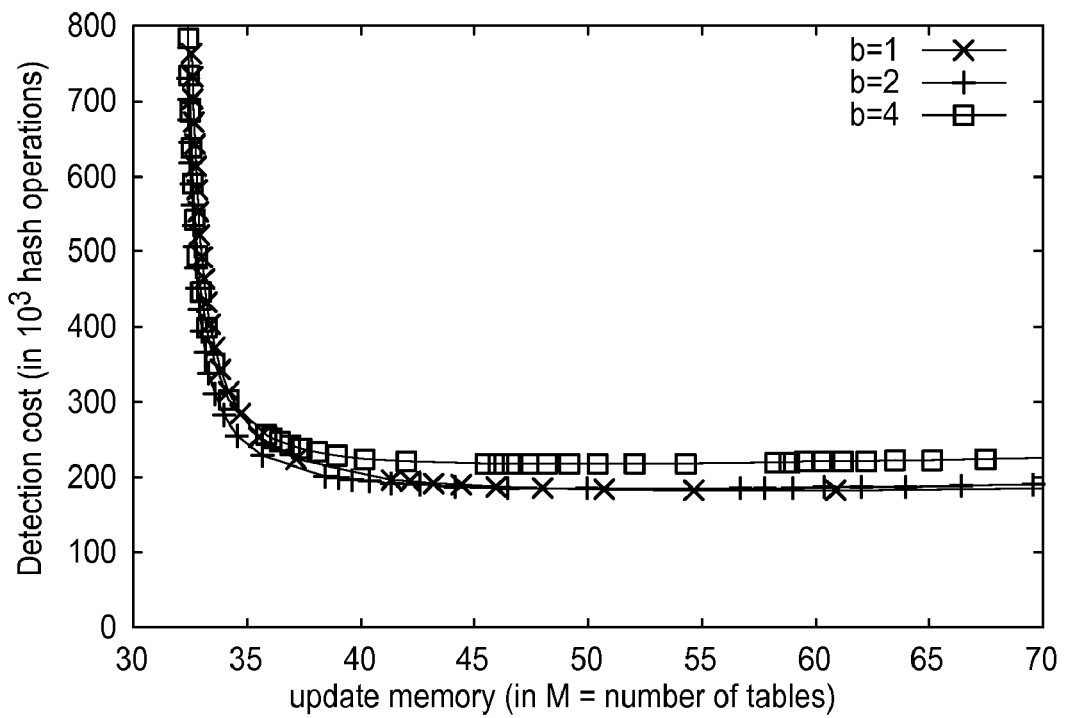
FIG. 11 illustrates how the sequential hashing scheme trades off between update memory and detection cost in an exemplary embodiment of the invention.

To understand the above results, FIG. 11 illustrates how the sequential hashing scheme trades off between the update memory and the detection cost in an exemplary embodiment of the invention. Evaluation of the values of b is illustrated for the case when non-significant keys have negligible contribution to the counter values, and hence $\gamma=\log 2$. By assuming that $N=2^{32}$, $H=500$ (and hence $K\approx722$), $N_1=216$ (and hence $N_i \geq 64H$), $\epsilon=0.2\%$. By varying a the corresponding update memory (in terms of M) and detection cost can be obtained. As shown in FIG. 11, when b=1 or 2, a smaller detection cost is obtained as compared to b=4, while the difference between b=1 and 2 is very small. For example, when b=2 and $\alpha=9$, $M\approx33$ (where $M_1=4$, $M_i=2$ for $2\leq i\leq D-1$, MD=15, and D=9), while the detection cost is about 400K, which is twice the minimum detection cost achieved for a larger update memory. Note that the number of tables in the lower-bound memory requirement is $\log_2(N/(\epsilon H))=32$, where the significant key detection is done by enumeration of the entire key space. Thus, with only one extra table, it's possible to recover all significant keys with a manageable detection cost.

Estimating Values of Significant Keys Using Linear Regression

A maximum likelihood based method is presented for estimating the significant key values under a linear regression model. This estimation can be useful for two reasons. First, when the number of significant keys is large, it is important to provide some guidance so that one can look at the most important ones first. Second, using the estimated values, the false positive rate can be reduced by eliminating those non-significant elements included in the set. It is important to realize that the sequential hashing detection algorithms presented earlier did not fully utilize the information in the counter values because only a threshold test was performed. By using estimation it's possible to reduce the false positive rate significantly at the expense of only a small increase in the false negative rate.

Given a candidate set C of the significant keys, let V be a vector of length |C| representing their values, and let Y be a vector of length L representing the counter values (or a change in the counter values for a significant traffic change user), for those buckets that contain at least one candidate key. By writing $\underline{Y}=AV+\delta$ (equation 9), where A is a L×|C| matrix whose columns represent how each candidate is mapped to the counter buckets that Y represents, and $\delta$ represents the contribution from the remaining non-significant keys to Y.

High Traffic User Estimation

Figure 12:
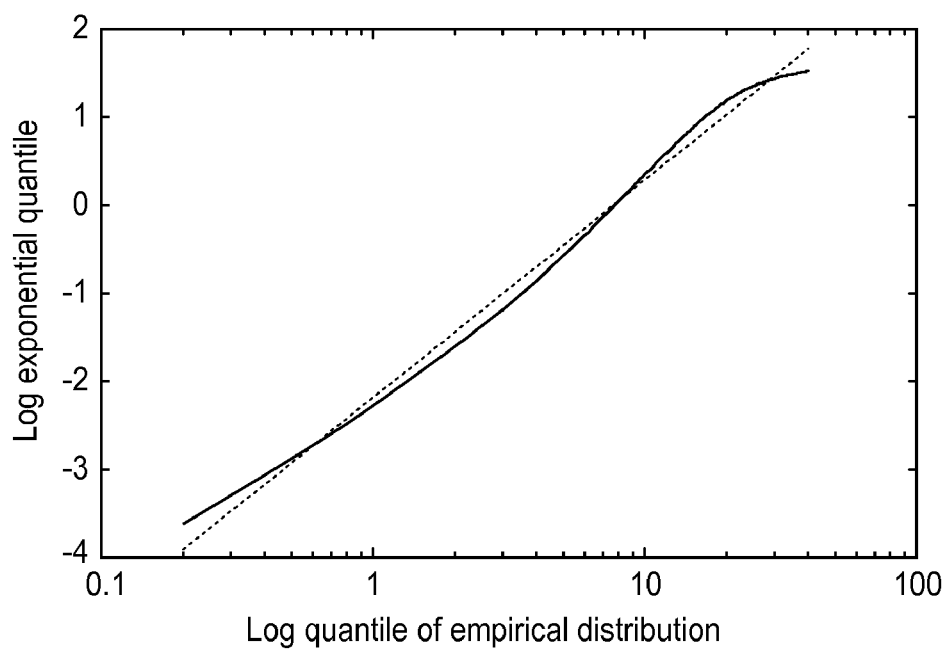
FIG. 12 shows a Weibull-QQplot of the observed δ0 distribution for the detection of at most 500 high traffic users in a real trace that was studied in an exemplary embodiment of the invention.

Based on empirical studies of real traces, for high traffic user estimation, it is found that the distribution of $\delta$ is well approximated by a Weibull distribution with mean $\theta$ and shape parameter $\beta$, i.e., $(\delta/\theta)^\beta \sim Exp(1)$, where Exp(1) stands for the exponential distribution with mean 1. FIG. 12 shows a Weibull-QQplot of the observed $\delta$ distribution for the detection of at most 500 high traffic users in a real trace that was studied, using a hash array with M=33 tables and K=722 buckets per table. The Weibull distribution gives an excellent approximation as a straight line that indicates there is an exact Weibull distribution.

When the shape parameter is 1, a Weibull reduces to an exponential distribution. In this case, the maximum likelihood estimate $\hat{V}_{MLE}$ is equivalent to solving the following linear programming problem with respect to V:

$$\text{maximize} \sum_{t=1}^{L} A_t V \text{ subject to } (y_l - A_t V) \geq 0, \quad \text{(equation 10)}$$

where $y_l$ is the l-th element of Y and $A_l$ is the l-th row of A.

A countmin estimator can be used, which is a computationally cheaper estimator of V. The countmin estimator for the value of a candidate high traffic user key is essentially the minimum of all bucket values of y that contain the candidate key. It is straightforward to show that if all the significant buckets contain exactly one high traffic user, the maximum likelihood estimator $\hat{V}_{MLE}$ reduces to the countmin estimator $\hat{V}$min. However, from Lemma 1, this is not true and only around 70% of the significant buckets contain exactly one high traffic user when $\gamma=\ln 2$ and the candidate size is close to H. It can be shown that both $\hat{V}_{min}$ and $\hat{V}_{MLE}$ have some small positive bias, which is approximately $$\text{bias} \approx E\left[\min_{1 \leq m \leq M} \tilde{Y}_m\right],$$

where $Y_m$ is a non-significant bucket in table $1 \leq m \leq M$. Because non-significant buckets are abundant (50% when the candidate size is close to H with $\gamma=\ln 2$ by using Lemma 1), the bias can be approximated accurately using a nonparametric method by obtaining many samples of M non-significant buckets and then taking the empirical mean of the minimum of each sample.

Significant Traffic Change User Estimation

Based on empirical studies of real traces, a distribution of $\delta$ was found in the case of significant traffic change users, which is well approximated by a double exponential distribution. In such case, the maximum likelihood estimate $\hat{V}_{MLE}$ for the linear regression problem in (equation 9) can be obtained by solving the following L1-regression problem:

$$\hat{V}_{MLE} \text{ minimizes} \sum_{t=1}^{L} |yl - a - AlV|, \quad \text{(equation 11)}$$

which can be done using standard packages. When all the significant buckets contain exactly one high traffic user, then $\hat{V}_{MLE}$ corresponds to the median estimator. The median estimator for the value of a candidate key is the median of all bucket values of y that contain the candidate key.

In addition to the preceding embodiments described herein, one skilled in the art will recognize that detecting traffic patterns in a data network may additionally include the use of an apparatus. The apparatus, in one exemplary embodiment, includes a memory, an interface system, and a processing system. The memory is adapted to store hash arrays. The interface system is adapted to receive traffic associated with a key. The processing system is coupled to the memory and the interface system, and is adapted to update a traffic total of each bucket that corresponds with the key, to identify high traffic buckets, and to detect traffic patterns of the data network.

Although specific embodiments were described herein, the scope of the invention is not limited to those specific embodiments. The scope of the invention is defined by the following claims and any equivalents thereof.

We claim:

1. A computer implemented method for detecting traffic patterns in a data network, the method comprising:

partitioning keys of the data network into D sub-keys, wherein each key has $|1 \leq i \leq D|$ sub-keys, D refers to the number of sub-keys in a key, each key having a length of D;

constructing D hash arrays, wherein each hash array i includes $M_i$ independent hash tables each having K buckets, with each of the buckets having an associated traffic total, wherein each of the D sub-keys corresponds with one of the D hash arrays, each of the sub-keys $D_i$ through $D_D$ corresponds to one of each of hash arrays i-D, each independent hash table $M_i$ corresponding to the ith hash array in a sequential hashing scheme, and each of the D sub-keys are associated with one bucket of each of the $M_i$ independent hash tables, wherein K refers to a number of buckets in each hash array, and wherein each of the keys corresponds with a single bucket of each of the $M_i$ independent hash tables;

updating a traffic total of each bucket that corresponds with a key responsive to receiving traffic associated with the key;

identifying high traffic buckets of the M independent hash tables having a traffic total greater than a threshold value; and detecting traffic patterns of the data network based on the high traffic buckets.

2. The computer implemented method of claim 1, wherein detecting the traffic patterns further comprises:

detecting high traffic users of the data network based on the high traffic buckets, wherein the high traffic users are keys of the data network having a traffic total exceeding a traffic total threshold.

3. The method of claim 2, wherein detecting the high traffic users further comprises:

identifying a candidate set of possible high traffic users based on the high traffic buckets, wherein identifying the candidate set comprises recursively performing from $|1 \leq i \leq D|$ for each of the D hash arrays the following steps:

concatenating each sub-key x' of a set $C_{i-1}$ of high traffic sub-keys identified for a previously checked hash array i-1 with a set of possible bit values from 0 to $2^{b_i}-1$ to form a set of sub-keys x";

checking buckets of the $M_i$ independent hash tables of a presently checked hash array i corresponding to a hash of each of the sub-keys x" to determine whether traffic totals of any of the checked buckets are less than the threshold value; and adding one or more sub-keys x" of the set of sub-keys x" to a set $C_i$ of possible high traffic sub-keys responsive to determining that none of the checked buckets for the one or more sub-keys x" have traffic totals less than the threshold value, wherein the candidate set is based on a set $C_D$ of possible high traffic sub-keys; and analyzing the candidate set to detect the high traffic users; and wherein x refers to a key;

x' and x" refers to sub-keys of a key;

C and $C_i$ refer to the size of the candidate set of high traffic users, wherein the notation of C with a subscript i denotes the corresponding quantities for the ith hash array in a sequential hashing scheme.

4. The computer implemented method of claim 3, including analyzing the candidate set further comprises:

performing linear regression on the candidate set to estimate the high traffic users.

5. The computer implements method of claim 1, wherein detecting the traffic patterns further comprises:

detecting significant traffic change users of the data network based on the high traffic buckets, wherein the significant traffic change users are keys of the data network having a change in traffic volume between two monitoring intervals which is greater than or equal to a traffic change threshold.

6. The computer implemented method of claim 5, wherein detecting the significant traffic change users further comprises:

identifying a candidate set of possible significant traffic change users based on the high traffic buckets, wherein identifying the candidate set comprises recursively performing from $|1 \leq i \leq D|$ for each of the D hash arrays the following steps:

concatenating each sub-key x' of a set $C_{i-1}$ of high traffic sub-keys identified for a previously checked hash array i-1 with a set of possible bit values from 0 to $2^{b_i}-1$ to form a set of sub-keys x";

checking buckets of the $M_i$ independent hash tables of a presently checked hash array i corresponding to a hash of each of the sub-keys x" to determine whether traffic totals of any of the checked buckets are less than the threshold value; and determining a number of misses for each of the set of sub-keys x", wherein the number of misses for a sub-key x" is based on a number of checked buckets corresponding to the sub-key x" that have a traffic total less than the threshold value;

adding one or more sub-keys x" of the set of sub-keys x" to a set $C_i$ of possible high traffic sub-keys responsive to determining that none of the checked buckets for the one or more sub-keys x" have traffic totals less than the threshold value, wherein the candidate set is based on a set $C_D$ of possible high traffic sub-keys; and analyzing the candidate set to detect the high traffic users; and wherein x refers to the key;

x' and x" refers to sub-keys of the key;

C and $C_i$ refer to the size of the candidate set of high traffic users, wherein the notation of C with a subscript i denotes the corresponding quantities for the ith hash array in a sequential hashing scheme.

7. The computer Implemented method of claim 1, wherein the number of the D hash arrays corresponds with the number of bits of the key.

8. The computer Implemented method of claim 1, wherein the key corresponds with a source address, a destination address, a source port, a destination port and a protocol of the traffic.

9. An apparatus for detecting traffic patterns in a data network, the apparatus comprising:

Memory storing D hash arrays, each hash array I, wherein $|1 \leq i \leq D|$ includes $M_i$ independent hash tables each having K buckets, each of the buckets having an associated traffic total, wherein keys of the data network are partitioned into D sub-keys, wherein each key has $|1 \leq i \leq D|$ sub-keys, D refers to the number of sub-keys in a key, each key having a length of D, wherein each of the D sub-keys corresponds with one of the D hash arrays, each of the sub-keys $D_i$ through $D_D$ corresponds to one of each of hash arrays i–D, each independent hash table $M_i$ corresponding to the ith hash array in a sequential hashing scheme, and each of the D sub-keys are associated with one bucket of each of the $M_i$ independent hash tables, wherein K refers to a number of buckets in each hash array, and each of the keys corresponds with a single bucket of each of the $M_i$ independent hash tables;

an interface system to receive traffic associated with a key; and a processing system coupled to the memory and coupled to the interface system, the processing system performs:
updating a traffic total of each bucket that corresponds with a key responsive to receiving traffic associated with the key;
identifying high traffic buckets of the M independent hash tables having a traffic total greater than a threshold value; and
detecting traffic patterns of the data network based on the high traffic buckets.

10. The apparatus of claim 9, wherein the processing system is further adapted to detect high traffic users of the data network based on the high traffic buckets, wherein the high traffic users are keys of the data network having a traffic total exceeding a traffic total threshold.

11. The apparatus of claim 10, wherein the processing system is further adapted to:
identify a candidate set of possible high traffic users based on the high traffic buckets, wherein identifying the candidate set comprises recursively performing from |1≦i≦D| for each of the D hash arrays the following steps:
concatenating each sub-key x' of a set $C_{i-1}$ of high traffic sub-keys identified for a previously checked hash array i−1 with a set of possible bit values from 0 to $2^{b_i}-1$ to form a set of sub-keys x";
checking buckets of the $M_i$ independent hash tables of a presently checked hash array i corresponding to a hash of each of the sub-keys x" to determine whether traffic totals of any of the checked buckets are less than the threshold value; and
adding one or more sub-keys x" of the set of sub-keys x" to a set $C_i$ of possible high traffic sub-keys responsive to determining that none of the checked buckets for the one or more sub-keys x" have traffic totals less than the threshold value,
wherein the candidate set is based on a set $C_D$ of possible high traffic sub-keys; and
analyzing the candidate set to detect the high traffic users; and
wherein
x refers to a key;
x' and x" refers to sub-keys of a key;
C and $C_i$ refer to the size of the candidate set of high traffic users, wherein the notation of C with a subscript i denotes the corresponding quantities for the ith hash array in a sequential hashing scheme.

12. The apparatus of claim 11, wherein the processing system is further adapted to perform linear regression on the candidate set to estimate the high traffic users.

13. The apparatus of claim 9, wherein the processing system is further adapted to detect significant traffic change users of the data network based on the high traffic buckets, wherein the significant traffic change users are keys of the data network having a change in traffic volume between two monitoring intervals which is greater than or equal to a traffic change threshold.

14. The computer implemented method of claim 13, wherein the processing system is further adapted to:
identify a candidate set of possible significant traffic change users based on the high traffic buckets, wherein identifying the candidate set comprises recursively performing from |1≦i≦D| for each of the D hash arrays the following steps:
concatenating each sub-key x' of a set $C_{i-1}$ of high traffic sub-keys identified for a previously checked hash array i−1 with a set of possible bit values from 0 to $2^{b_i}-1$ to form a set of sub-keys x";
checking buckets of the $M_i$ independent hash tables of a presently checked hash array i corresponding to a hash of each of the sub-keys x" to determine whether traffic totals of any of the checked buckets are less than the threshold value; and
determining a number of misses for each of the set of sub-keys x", wherein the number of misses for a sub-key x" is based on a number of checked buckets corresponding to the sub-key x" that have a traffic total less than the threshold value;
adding one or more sub-keys x" of the set of sub-keys x" to a set $C_i$ of possible high traffic sub-keys responsive to determining that none of the checked buckets for the one or more sub-keys x" have traffic totals less than the threshold value,
wherein the candidate set is based on a set $C_D$ of possible high traffic sub-keys; and
analyzing the candidate set to detect the high traffic users; and
wherein
x refers to the key;
x' and x" refers to sub-keys of the key;
C and $C_i$ refer to the size of the candidate set of high traffic users, wherein the notation of C with a subscript i denotes the corresponding quantities for the ith hash array in a sequential hashing scheme.

15. The apparatus of claim 9, wherein the number of the D hash arrays corresponds with the number of bits of the key.

16. The computer Implemented method of claim 1, wherein the key corresponds with a source address, a destination address, a source port, a destination port and a protocol of the traffic.

17. A computer implemented method for detecting traffic patterns in a data network, the method comprising:
constructing a multi-level hashing structure with D hash arrays, wherein each hash array i includes Mi independent hash tables each having K buckets, each of the K buckets having an associated traffic total;
partitioning keys of the data network into D sub-keys, each of the D sub-keys for the keys having a variable length of i between 1 to D, the keys having a length of D, with a value of i representing a number of sequential bits bi of the keys, wherein each of the D sub-keys corresponds with one of the D hash arrays, each of the sub-keys $D_i$ through $D_D$ corresponds to one of each of hash arrays i–D, each independent hash table $M_i$ corresponding to the ith hash array in a sequential hashing scheme, and each of the D sub-keys are associated with one bucket of each of the $M_i$ independent hash tables of a corresponding hash array i, wherein K refers to a number of buckets in each hash array, and wherein each of the keys corresponds with a single bucket of each of the $M_i$ independent hash tables;

receiving traffic for a key;

identifying sub-keys of the key;

updating a traffic total for buckets corresponding to the sub-keys of the key;

identifying high traffic buckets of the $M_i$ independent hash tables of each hash array i having a traffic total greater than a threshold value;

identifying a first candidate set of possible high traffic users of the data network based on the high traffic buckets;

detecting high traffic users of the data network based on the first candidate set, wherein the high traffic users are keys of the data network having a traffic total greater than or equal to a traffic total threshold;

identifying a second candidate set of possible significant traffic change users of the data network based on the high traffic buckets; and detecting significant traffic change users of the data network based on the second candidate set, wherein the significant traffic change users are keys of the data network having a change in traffic volume between two monitoring intervals which is greater than or equal to a traffic change threshold.

18. The computer implemented method of claim 17, wherein identifying the first candidate set comprises recursively performing from $|1 \leq i \leq D|$ for each of the D hash arrays the following steps:

concatenating each sub-key x' of a set $C_{i-1}$ of high traffic sub-keys identified for a previously checked hash array i−1 with a set of possible bit values from 0 to $2^{b_i}-1$ to form a set of sub-keys x";

checking buckets of the $M_i$ independent hash tables of a presently checked hash array i corresponding to a hash of each of the sub-keys x" to determine whether traffic totals of any of the checked buckets are less than the threshold value; and adding one or more sub-keys x" of the set of sub-keys x" to a set $C_i$ of possible high traffic sub-keys responsive to determining that none of the checked buckets for the one or more sub-keys x" have traffic totals less than the threshold value, wherein the candidate set is based on a set $C_D$ of possible high traffic sub-keys; and analyzing the candidate set to detect the high traffic users; and wherein x refers to a key;

x' and x" refers to sub-keys of a key;

C and $C_i$ refer to the size of the candidate set of high traffic users, wherein the notation of C with a subscript i denotes the corresponding quantities for the ith hash array in a sequential hashing scheme.

19. The computer implemented method of claim 17, wherein detecting the high traffic users further comprises:

performing linear regression on the candidate set to estimate the high traffic users.

20. The computer implemented method of claim 17, wherein identifying the second candidate set comprises recursively performing from $|1 \leq i \leq D|$ for each of the D hash arrays the following steps:

concatenating each sub-key x' of a set $C_{i-1}$ of high traffic sub-keys identified for a previously checked hash array i−1 with a set of possible bit values from 0 to $2^{b_i}-1$ to form a set of sub-keys x";

checking buckets of the $M_i$ independent hash tables of a presently checked hash array i corresponding to a hash of each of the sub-keys x" to determine whether traffic totals of any of the checked buckets are less than the threshold value; and determining a number of misses for each of the set of sub-keys x", wherein the number of misses for a sub-key x" is based on a number of checked buckets corresponding to the sub-key x" that have a traffic total less than the threshold value;

adding one or more sub-keys x" of the set of sub-keys x" to a set $C_i$ of possible high traffic sub-keys responsive to determining that none of the checked buckets for the one or more sub-keys x" have traffic totals less than the threshold value, wherein the candidate set is based on a set $C_D$ of possible high traffic sub-keys; and analyzing the candidate set to detect the high traffic users; and wherein x refers to the key;

x' and x" refers to sub-keys of the key;

C and $C_i$ refer to the size of the candidate set of high traffic users, wherein the notation of C with a subscript i denotes the corresponding quantities for the ith hash array in a sequential hashing scheme.

* * * * *

UNITED STATES PATENT AND TRADEMARK OFFICE
CERTIFICATE OF CORRECTION

PATENT NO. : 7,779,143 B2
APPLICATION NO. : 11/770430
DATED : August 17, 2010
INVENTOR(S) : Bu et al.

It is certified that error appears in the above-identified patent and that said Letters Patent is hereby corrected as shown below:

Title Page, Item (57) in ABSTRACT, the text "$1 \leqq i \leqq D$" should read "$1 \leq i \leq D$"

In column 2, lines 41, 43 and 57, the text "$1 \leqq i \leqq D$" should read "$1 \leq i \leq D$"

In column 3, lines 5, 21, and 36, the text "$1 \leqq i \leqq D$" should read "$1 \leq i \leq D$"

In column 8, lines 20, 32, and 41, the text "$1 \leqq i \leqq D$" should read "$1 \leq i \leq D$"

In column 9, lines 26 and 61, the text "$1 \leqq i \leqq D$" should read "$1 \leq i \leq D$"

In column 9, line 34, the text "$1 \leqq i \leqq D, 1 \leqq j \leqq M$, and $1 \leqq k \leqq K$" should read "$1 \leq i \leq D, 1 \leq j \leq M$, and $1 \leq k \leq K$".

In column 10, line 26, the text "$2 \leqq i \leqq D$" should read "$2 \leq i \leq D$".

In column 10, line 37, the text "$1 \leqq i \leqq D, 1 \leqq j \leqq M$" should read "$1 \leq i \leq D, 1 \leq j \leq D$".

In column 10, line 39, the text "$1 \leqq i \leqq D$" should read "$1 \leq i \leq D$".

In column 11, line 2, the text "$1 \leqq i \leqq D$" should read "$1 \leq i \leq D$".

In column 12, lines 3 and 6, the text "$1 \leqq i \leqq D$" should read "$1 \leq i \leq D$".

In column 12, lines 5 and 20, the text "$1 \leqq i \leqq D - 1$" should read "$1 \leq i \leq D-1$".

In column 12, lines 8 and 13, the text "$2 \leqq i \leqq D$" should read "$2 \leq i \leq D$".

In column 12, line 44, the text "$Computation \leqq (1 + \alpha)2^{b}$" should read "$Computation \leq (1 + \alpha)2^{b}$".

In column 13, line 8, the text "$N_i \geqq 64H$" should read "$N_i \geq 64H$".

In column 13, line 14, the text "$2 \leqq i \leqq D - 1$" should read "$2 \leq i \leq D-1$".

In column 15, lines 7 and 43, the text "$|1 \leqq i \leqq D|$" should read "$|1 \leq i \leq D|$".

In column 16, lines 21 and 63, the text "$|1 \leqq i \leqq D|$" should read "$|1 \leq i \leq D|$".

In column 17, line 34 and column 18 line 9, the text "$1 \leqq i \leqq D$" should read "$|1 \leq i \leq D|$".

In column 19, line 25 and column 20 line 13, the text "$1 \leqq i \leqq D$" should read "$|1 \leq i \leq D|$"

Signed and Sealed this

Sixteenth Day of November, 2010

David J. Kappos
*Director of the United States Patent and Trademark Office*